Jan. 6, 1959 LE ROY R. PATTERSON, JR 2,867,035
THERMAL INSULATION
Filed Oct. 30, 1952
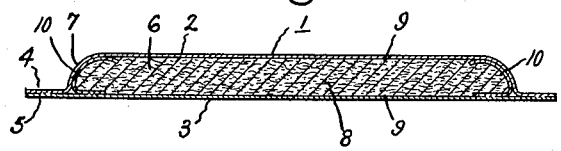
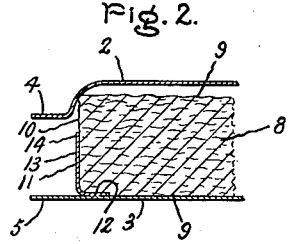
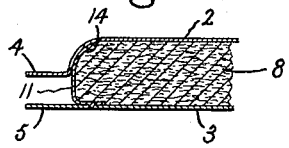
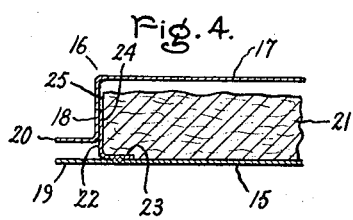 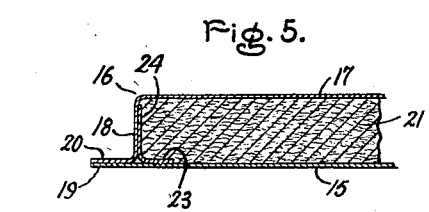
Inventor:
Leroy R. Patterson, Jr.
by
His Attorney.

United States Patent Office 2,867,035
Patented Jan. 6, 1959

2,867,035

THERMAL INSULATION

Le Roy R. Patterson, Jr., Erie, Pa., assignor to General Electric Company, a corporation of New York Application October 30, 1952, Serial No. 317,807

3 Claims. (Cl. 29—455)

My invention relates to thermal insulation and to methods of manufacture thereof.

This application is a continuation-in-part of my application Serial No. 248,191 filed September 25, 1951, now abandoned.

Batts of thermal insulation may comprise a plurality of glass filaments. Such batts as presently employed are usually of substantial thickness and resiliency. It is desirable for some purposes to compress such batts to a much smaller thickness and greater density. For example, as set forth in the copending application of Herbert M. Strong and Francis P. Bundy, Serial No. 236,788, filed July 14, 1951, now abandoned, and assigned to the General Electric Company, the assignee of the present invention, vacuum insulation, that is, insulation employing an evacuated space, may be made using a filler material comprising a plurality of glass filaments arranged in a particular manner. Since the filler material must support the spaced walls against atmospheric pressure, it is compressed substantially in use compared to its condition when not so subjected to the aforementioned differential pressure. If the batt of such filler material in its uncompressed state is assembled between the walls and then the walls are pushed together compressing the batt, glass filaments and shot may find their way between the edges of the wall to be sealed, impairing the weld and preventing the securing or maintenance of a satisfactorily low pressure between the walls. Even where the batt is precompressed in accordance with the copending application of Alfred G. Janos, Serial No. 236,971, filed July 16, 1951, now abandoned and assigned to the General Electric Company, the assignee of the present invention, it may be desirable as an additional precaution to provide an arrangement for minimizing the entry of glass filaments and shot into the weld area. Also, even where such precompressed batts are employed there is still some compression thereof during the final assembly. By my invention provision is made for minimizing the possibility of the fibers and shot finding their way into the space between the sealing edges of the spaced walls.

It is an object of my invention to provide an improved thermal insulating structure.

It is another object of my invention to provide an improved construction particularly suitable for insulating structures employing a filler material within an evacuated space.

It is a further object of my invention to provide an improved method of making an insulating structure including an evacuated space and filler material therein.

Further objects and advantages of my invention will become apparent as the following description proceeds and the features of novelty which characterize my invention will be pointed out with particularity in the claims annexed to and forming part of this specification.

In carrying out the objects of my invention, two walls are employed to form the insulating structure, the walls being welded along their edges and being shaped to provide a space between the walls. A compressible filler material is provided between the walls to support them against external atmospheric pressure when the space therebetween has been evacuated. A baffle is provided between the side walls of the batt of compressible insulating material and the engaging portions of the two spaced walls to shield the side surfaces of the batt of insulating material from the edges to be welded and thereby to block movement of portions of the filler material into the weld area.

For a better understanding of my invention, reference may be had to the accompanying drawing in which Fig. 1 illustrates an insulating structure showing one embodiment of my invention.

Fig. 2 illustrates an intermediate stage in the manufacture of the insulating structure of Fig. 1.

Fig. 3 illustrates a second intermediate stage in the manufacture of the insulating structure of Fig. 1.

Fig. 4 illustrates an intermediate stage in the manufacture of a modified form of my invention.

Fig. 5 illustrates a completed insulating structure showing this modified form of my invention.

Referring to Fig. 1 there is shown an insulating structure 1 which includes two metal walls 2 and 3. The walls 2 and 3 include flanged edge portions 4 and 5 which, in the completed structure are in engagement with each other, and the walls are welded together at the edge portions 4, 5 to seal the space 6 between the walls 2 and 3.

In the form of my invention illustrated, the wall 3 is made flat and the wall 2 includes a curved portion 7, so that the major portions of the walls are spaced from each other. To provide a more effective insulating structure, the space between the walls is evacuated in any conventional manner. In order to support the walls 2 and 3 against the differential pressure resulting from the external atmospheric pressure when the space 6 has been evacuated, a batt 8 of a compressible glass fiber heat-insulating material is placed between the walls 2 and 3. This heat-insulating material 8 may be of the type disclosed in the aforementioned copending application of Herbert M. Strong and Francis P. Bundy. The batt 8 of heat-insulating material includes end walls or surfaces 9 and side walls or surfaces 10. Between the side surfaces or peripheral walls 10 and the weld area at the edge portions 4 and 5 of the walls 2 and 3, a flexible baffle or barrier 11 is provided to block the entrance of portions of the batt, such as glass fibers and shot, into the weld area. The baffle 11 may be formed of any suitable material, preferably a material having a relatively low thermal conductivity, the material being sufficiently thin to have the necessary flexibility. The material employed is also chosen to have little tendency to give off gases which might adversely affect the low pressure within the space 6. Materials of low thermal conductivity, such as stainless steel and silicon steel, may be employed; materials of a relatively high thermal conductivity may also be employed if they are thin enough to conduct a relatively small amount of heat. The specific function of the baffle 11 is described in more detail below in discussing the method of making the insulating structure.

The steps in the manufacture of the insulating structure are shown in Figs. 2 and 3. Referring first to Fig. 2, the batt 8 of insulating material is shown at the time of assembly between the walls 2 and 3, and before any appreciable amount of compression of the batt 8 has occurred. In Fig. 2, the baffle 11 is also shown in its original form. In this form it will be observed that the baffle 11 is of L-shaped cross section, including two legs 12 and 13. In the specific embodiment illustrated, the leg 12 is welded or otherwise secured to the wall 3, although, if desired, the baffle 11 need not be secured to wall 3 and may merely be loosely positioned adjacent the side surface 10 of the batt 8. The batt of heat-insulating material 8 is chosen so as to substantially fill the space between the walls 2 and 3, and the baffle 11 is so positioned on the wall 3 that the leg 13 of this baffle extends generally normal to the walls 2 and 3 and adjacent the side surface 10 of the batt 8.

In order that the batt 8 may be sufficiently compressed to adequately support the walls 2 and 3 against the external atmospheric pressure after evacuation of the insulating structure, it will be apparent that a substantial compression of this batt must occur. In the absence of the baffle 11, individual fibers and shot present in the batt 8 may, during compression, move laterally into the weld area between the flanged edge portions 4 and 5 of the walls 2 and 3, respectively. It has been found that the presence of such glass fibers and shot in the weld area has a deleterious effect on the weld and it is, of course, essential in manufacturing a satisfactory insulating structure of this type that a perfect weld be secured. To obviate this difficulty, the baffle 11 is utilized and is arranged in the manner described above. The length of the leg 13 of the baffle is chosen so as to cover a substantial portion of the side surface 10 of the batt 8 when the batt is in its uncompressed state. As shown, the baffle need not extend the entire thickness of the compressed batt, since I have found that there is little sidewise movement of the fibers and shot during the first 25% to 30% of the compression of the batt. It is during the latter half of the compression that the baffle needs to function for blocking the sidewise movement of the fibers and shot into the weld area. Hence, satisfactory functioning of the baffle can be secured with the leg 13 exceeding, say, ½ the thickness of the uncompressed batt. As the walls 2 and 3 are squeezed together toward the position shown in Fig. 3, the batt is confined within the space 6 by the leg 13 of the baffle 11. This blocks the entrance of the individual glass fibers and shot from the batt 8 into the weld area between the edge portions 4 and 5 of the walls 2 and 3, respectively. While cross-sectional views of the insulating structure have been shown in Figs. 1, 2 and 3 it will be understood that the baffle 11 extends adjacent the side surfaces 10 of the batt along the entire periphery of the batt so as to shield the entire peripheral weld area of the vacuum insulating structure from the aforementioned glass fiber and shot.

As mentioned above, the wall 2 is shaped to include curved portions 7 so as to provide a space between the major portions of the wall 2 and the flat wall 3. These curved peripheral portions 7 have a second effect in guiding the free end 14 of the leg 13 of the baffle 11 into its final position. As the walls 2 and 3 approach the position shown in Fig. 3, the free end 14 of the baffle 11 engages the inner surface of the wall 2 in the region of the curved portion 7. The curvature of the portion 7 of the wall 2 guides the end 14 inwardly toward the position shown in Fig. 3. To facilitate this movement the baffle may be formed of a separate strip for each side of the batt, or alternatively it may be slit at the corners. The flexible baffle 11 envelops the side surface or wall of the batt 8 of heat-insulating material along the entire periphery thereof, blocking the movement of glass fibers and shot into the weld area between the flange edge portions 4 and 5. Further movement of the walls 2 and 3 toward each other until the edge portions 4 and 5 are in engagement causes the baffle 11 to assume the position shown in Fig. 1. When the edge portions 4 and 5 have been forced into engagement, they are welded or otherwise suitably secured to each other to seal the space between the walls. The space is then evacuated in any conventional manner well known in the art to provide a very low pressure within the space 6, the compressed batt 8 of heat-insulating material providing a support for the walls against the resultant differential pressure exerted on the external surface thereof.

A modified form of my invention is shown in Figs. 4 and 5. The insulating structure there disclosed includes a flat wall 15 and a pan-shaped wall 16. This latter wall includes a central flat portion 17 and a peripheral portion 18 extending normal to the central portion 17 at the edges thereof. The walls 15 and 16 include edges 19 and 20, respectively, which are adapted to be welded to seal the envelope in the manner of the form previously described.

In the form shown in Figs. 4 and 5 a batt of filler material 21, which is composed of glass fiber heat-insulating material such as that described and claimed in the aforementioned Strong & Bundy application, is employed. In the form of the invention shown in Figs. 4 and 5 the batt of filler material is precompressed in accordance with the invention described and claimed in the aforementioned copending application of Alfred G. Janos. Although, after being treated in the manner of the aforementioned Janos invention, the batt expands to a limited extent, the thickness is still only a small fraction of the thickness of an untreated batt such as that employed in the structure shown in Figs. 1, 2 and 3. Thus, the thickness of the batt 21 as shown in Fig. 4 may be only 25% greater than the final thickness of the filler material as shown in Fig. 5, whereas the thickness of uncompressed batt 8 in the form previously described may be six or more times as great as the final thickness to be secured.

In the form shown in Figs. 4 and 5 a shield or baffle 22 is employed. The baffle 22 includes a leg 23 which is secured in any suitable manner, as by welding, to the flat wall 15 and a second leg 24 which extends normal to the flat wall 15. The baffle in this form of my invention need not be flexible since deformation thereof is not necessary. The leg 24 of the baffle is adapted to be received between the side surfaces 25 of the batt 21 and the peripheral portion 18 of the wall 17. The leg 24 is of a length slightly less than the final thickness of the insulating structure, as indicated in Fig. 5.

In making the insulating structure shown in Figs. 4 and 5 the precompressed batt 21 is placed on the flat wall 15 within the confines of the baffle 22. The batt projects, as shown in Fig. 4, a short distance above the top of the baffle. The pan-shaped wall 16 is then assembled overlapping the batt 21 and the baffle 22. The baffle extends around the entire periphery of the side surfaces 25 and thereby completely blocks the entrance of any glass fibers or shot from the batt 21 into the weld area between the edges 19 and 20 of the walls 15 and 16. The walls 15 and 16 are then pressed toward each other until the edges 19 and 20 come in contact, and these edge portions are then welded to seal the envelope of the insulating structure formed by the walls 15 and 16. While the baffle 22 is preferably secured to the wall 15, it will be apparent that if desired it could be loosely assembled in the position shown with the leg 24 thereof extending adjacent the side surfaces 25 of the batt, the baffle being held in position between the batt and the peripheral portion 18 of the wall 16 after the assembly of the walls is completed.

While I have shown and described specific embodiments of my invention, I do not desire my invention to be limited to the particular constructions shown and described, and I intend, by the appended claims, to cover all modifications within the spirit and scope of my invention.

What I claim and desire to secure by Letters Patent of the United States is:

1. The method of making an insulating structure which comprises providing a pan shaped wall and a second wall both including edge portions, placing a batt of compressible glass fiber insulation including end surfaces and side surfaces between said walls, providing a baffle generally normal to said walls and adjacent said side surfaces of said batt and extending around the entire periphery of said side surfaces, pressing said walls toward each other to compress said batt and to bring said edge portions into engagement, said baffle being interposed between said side surfaces of said batt and said edge portions during said movement of said walls, and welding said edge portions to seal said walls to each other.

2. The method of making an insulating structure which comprises providing a pan shaped wall and a second wall both including edge portions, placing a batt of compressible glass fiber insulation including end surfaces and side surfaces between said walls, providing a flexible baffle generally normal to said walls and adjacent said side surfaces of said batt and extending around the entire periphery of said side surfaces, pressing said walls toward each other to compress said batt and to bring said edge portions into engagement, said baffle enveloping said side surfaces of said batt during said movement of said walls, and welding said edge portions to seal said walls to each other.

3. The method of making an insulating structure which comprises providing a pan shaped wall and a second wall both including edge portions, one of said walls including a curved portion adjacent its edge portion, placing a batt of compressible glass fiber insulation between said walls, providing a flexible baffle generally normal to said walls and extending between said batt and said edge portions around the entire peripheral walls of said batt, said baffle being secured to the other of said walls, pressing said first-named walls toward each other to compress said batt and to bring said edge portions into engagement, the free end of said baffle engaging said curved portion of said one of said walls during the movement of said walls whereby said free end is curved inwardly to envelop said side surfaces of said batt, and welding said edge portions to seal said walls to each other.

References Cited in the file of this patent

UNITED STATES PATENTS

| Number | Name | Date |
|---|---|---|
| 1,554,395 | Young | Sept. 22, 1925 |
| 1,971,064 | Corlette et al. | Aug. 21, 1934 |
| 2,000,882 | Comstock | May 7, 1935 |
| 2,067,015 | Munters | Jan. 5, 1937 |
| 2,160,001 | Saborsky | May 30, 1939 |
| 2,491,761 | Parker et al. | Dec. 20, 1949 |
| 2,504,421 | Johnson et al. | Apr. 18, 1950 |
| 2,540,563 | Workman | Feb. 6, 1951 |